United States Patent [19]

Wolff et al.

[11] Patent Number: 4,517,335

[45] Date of Patent: May 14, 1985

[54] PROCESS FOR VULCANIZATION OR CROSS-LINKING HALOGEN CONTAINING RUBBERS IN THE PRESENCE OF SILICON CONTAINING ISOTHIURONIUM COMPOUNDS

[75] Inventors: Siegfried Wolff, Bornheum-Merten; Heinz Grewatta, Cologne, both of Fed. Rep. of Germany; Wolfgang Buder, Salvador-Bahia, Brazil

[73] Assignee: Degussa Aktiengesellschaft, Frankfurt am Main, Fed. Rep. of Germany

[21] Appl. No.: 621,626

[22] Filed: Jun. 18, 1984

[63] Related U.S. Application Data

Continuation of Ser. No. 614,170, May 25, 1984, now abandoned.

[30] Foreign Application Priority Data

May 27, 1983 [DE] Fed. Rep. of Germany ....... 3319251

[51] Int. Cl.$^3$ ........................... C08J 3/24; C08K 3/34; C08K 5/54; C08L 23/28
[52] U.S. Cl. .................................... 524/552; 524/105; 524/188; 524/269; 524/430; 524/432; 524/433; 524/434; 524/445; 524/447; 524/448; 524/456; 524/493; 524/585
[58] Field of Search ............... 524/552, 105, 188, 269, 524/430, 432, 433, 434, 445, 448, 456, 493, 585

[56] References Cited

U.S. PATENT DOCUMENTS

| | | | |
|---|---|---|---|
| 4,222,915 | 9/1980 | Wolff et al. | 524/433 |
| 4,229,333 | 10/1980 | Wolff et al. | 524/575 |

FOREIGN PATENT DOCUMENTS

| | | |
|---|---|---|
| 3220712 | 6/1982 | Fed. Rep. of Germany . |
| 740762 | 6/1980 | U.S.S.R. . |

OTHER PUBLICATIONS

CA 84(6), 32298(d), Migorod et al., "New Activators of Rubber Regeneration", 1975.

*Primary Examiner*—Herbert J. Lilling
*Attorney, Agent, or Firm*—Cushman, Darby & Cushman

[57] ABSTRACT

The invention is directed to vulcanizable halogen containing rubber mixtures which contain a silicate filler and a silicon containing isothiuronium compound and a process for vulcanizing or cross-linking these mixtures.

20 Claims, No Drawings

PROCESS FOR VULCANIZATION OR CROSS-LINKING HALOGEN CONTAINING RUBBERS IN THE PRESENCE OF SILICON CONTAINING ISOTHIURONIUM COMPOUNDS

Cross Reference To Related Application

This application is a continuation of application Ser. No. 614,170, filed on May 25, 1984 and now abandoned.

BACKGROUND OF THE INVENTION

The invention is directed to vulcanizable halogen rubber mixtures which contain a silicate filler, in a given case mixed with carbon black, and at least one silicon containing isothiuronium compound and a process for vulcanizing or crosslinking these mixtures.

It is known that it is necessary to employ a silane as a component of the mixture in sulfur vulcanizable rubber mixtures which have a high content of silicate fillers, such as for example precipitated silica, in order to impart sufficiently good properties to the vulcanizate.

In German Pat. No. AS 2819638 (and in the related Wolff U.S. Pat. No. 4,222,915, the entire disclosure of which is hereby incorporated by reference and relied upon) there is described the fact that valuable vulcanization products are formed from rubber mixtures based on halogen containing types of rubbers if the mixtures contain specific halogen containing silanes.

These types of mixtures according to the state of the art frequently contain as vulcanization accelerators compounds from the thiourea class.

SUMMARY OF THE INVENTION

It has now been found unexpectedly that vulcanization products having improved properties can be produced from the known halogen rubber mixtures if in place of a halogen containing silane and an accelerator made of the thiourea class there is worked in a silicon containing isothiuronium compound.

The subject matter of the invention is a vulcanizable rubber mixture containing at least one halogen rubber, a silicate filler, and optionally a halosilane, which comprises an isothiuronium compound of the formula

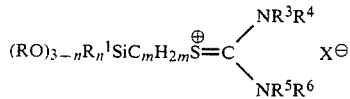

in an amount of 0.1 to 5 parts by weight based on 100 parts by weight of the halogen rubber, in which X is chloride, bromide or iodide,
m is a number from 1 to 6,
$R^1$ is a $C_1$ to $C_5$ alkyl group, a $C_5$ or $C_6$-cycloalkyl group or the phenyl group,
R is a $C_1$ to $C_5$ alkyl group, a $C_5$ or $C_6$ cycloalkyl group, the β-methoxyethyl group, the phenyl group or the benzyl group,
n is 0, 1 or 2,
$R^3$, $R^4$, $R^5$, $R^6$ are the same or different and are hydrogen, or $C_1$–$C_5$ alkyl group, or $R^3$, $R^5$ are hydrogen and $R^4$, $R^6$ are the same or different and are hydrogen, a $C_5$–$C_6$-cycloalkyl group, the phenyl or the benzyl group, or $R^4$ and $R^6$ together are a connected $C_2$–$C_4$ alkylene chain.

The isothiuronium compounds are used in an amount of 0.1 to 5 parts by weight, preferably 0.1 to 2.0, based on 100 part by weight of the halogen rubber. Included in the isothiuronium compounds there are particularly mentioned compounds which have attached to the silicon atom a triethoxy, trimethoxy, a diethoxymethyl or a dimethoxymethyl group in which $C_mH_{2m}$ is ethylene, propylene or butylene and in which the isothiuronium group is substituted on the nitrogen atoms in each case by two methyl or ethyl groups or in each case by a hydrogen atom, a methyl, ethyl, butyl or phenyl group, whereby the hydrocarbon residues can be the same or different.

$R^1$ can be for example methyl, ethyl, propyl, isopropyl, butyl, amyl, cyclopentyl, cyclohexyl or phenyl, R for example can be methyl, ethyl, propyl, isopropyl, butyl, sec, butyl, amyl, cyclopentyl, cyclohexyl, α-methoxymethyl, the phenyl group or the benzyl group, $R^3$, $R^4$, $R^5$ and $R^6$ each can be for example hydrogen, methyl, ethyl, propyl, isopropyl, butyl, sec, butyl or amyl, or $R^3$ and $R^5$ can be halogen and $R^4$ and $R^6$ hydrogen, cyclopentyl, cyclohexyl, phenyl or benzyl or $R^4$ and $R^6$ together can be ethylene, propylene or butylene, i.e. form a 5 to 7 member ring with the two nitrogen atoms and the carbon atom of the isothiuronium group.

The organosilanes mentioned which are employed according to the invention are obtained according to a known process from thiourea derivatives of the formula

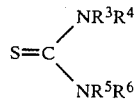

and halosilanes of the formula

Processes of production are described for example in Ryan U.S. Pat. No. 3,215,718, Koerner U.S. Pat. No. 3,314,982 and German Pat. No. 2120002. The entire disclosures of Ryan, Koerner and the German patent are hereby incorporated by reference and relied upon. Any of the organosilanes of formula I supra mentioned in any of these references can be employed in the present invention.

The composition of the mixtures based on halogen rubber is known to one of ordinary skill in the art. Thereby there are understood the basic mixtures of this type of product, such as are described e.g. in the German Pat. No. AS 2819638 and related Wolff U.S. Pat. No. 4,222,915. However, this art was ignorant of the advantageous possibilities of using isothiuronium compounds of formula I. The amounts of the individual components of the mixture can be varied within wide limits.

In using the silicon containing isothiuronium compounds in contrast to the above-mentioned basic mixtures, e.g. of Wolff, there is eliminated the mixing in of elemental sulfur. Likewise, there is not needed additional accelerator in addition to the isothiuronium compounds.

Free halosilanes of formula III can be present in the vulcanizable mixture of the invention in the amount of 0 to 3 parts by weight, preferably 0 parts by weight per 100 parts of halogen rubber.

As the usable halorubbers these can be employed for example halogenated butyl rubber, especially brominated or chlorinated butyl rubber, chlororubber (e.g. chlorinated natural rubber), rubber hydrochloride and preferably the halogenated butyl rubbers and particularly the polymers of 2-chlorobutadiene-1,3. There can also be employed chlorosulfonated polyethylene.

The silicate fillers used in the invention, also employed as mixtures of two or more fillers, are known as of themselves in rubber technology. In this connection the term "silicate filler" is broad and refers to fillers which are compatible with rubbers or which can be worked into rubbers and which consist of silicates, contain silicates and/or contain chemically bound silicates in the widest sense. Specific reference is made to the following silicate fillers.

Highly dispersed silica fillers (silicon dioxide) with specific surface areas in the range of about 5 to 1000, preferably 20 to 400 m$^2$/g (determined with gaseous nitrogen according to the known BET method) and with primary particle sizes in the range of about 10 to 400 nm, which can be produced, e.g., by precipitation from solutions of silicates with inorganic acids, by hydrothermal decomposition, by hydrolytic and/or oxidative high temperature decomposition, also called flame hydrolysis, of volatile silicon halides or by an electric arc process. These fillers in a given case can also be present as mixed oxides or oxide mixtures with the oxides of the metals aluminum, magnesium, calcium, barium, zinc, zirconium and/or titanium.

Synthetic silicates, e.g., aluminum silicate or alkaline earth silicates such as magnesium silicate or calcium silicate, with special surface areas of about 20 to 400 m$^2$/g and primary particle sizes of about 10 to 400 nm.

Natural silicates, e.g., kaolin, clays and asbestos as well as natural silicas as for example quartz and kieselguhr.

Glass fibers and glass fiber products such as mats, strands, fabrics and the like as well as glass microballons.

The silicate fillers mentioned are preferably added in an amount of about 10 parts, or in a given case even below, up to about 250 parts by weight based on 100 parts by weight of the rubber polymers.

As mixtures of fillers there can be mentioned silica-kaolin or silica-glass fibers-asbestos as well as blends of the silicate containing reinforcing fillers with the known rubber blacks, e.g., silica-ISAF black or silica-glass fiber cord-HAF black.

As silicate fillers according to the invention there are preferred the mentioned highly dispersed or active silicas, especially the precipitated silicas and preferably in amounts of 5 to 150 parts by weight, based on 100 parts by weight of rubber.

Carbon black can additionally be added to the rubber mixtures of the invention, not only for gray or black pigmentation of the vulcanizate but to produce particularly valuable vulcanization properties, in which case the known rubber blacks are preferred. The carbon black is added in an amount of 0 to 150 parts by weight preferably 0.1 to 80 parts by weight based on 100 parts by weight of rubber in the new rubber mixtures.

A lower limit with the number zero in the scope of the present invention means that the constituent of the mixture can be present in the rubber mixture but is not essential. If carbon black is present in a mixture the lower limit is 0.1 by weight per 100 parts of rubber.

For the case of the presence of silicate filler and carbon black in the rubber mixtures the complete filler content based on 100 parts by weight of rubber is limited to a maximum of 250 parts by weight. Generally one can regard 150 parts by weight of total filler as the upper limit, although as stated the filler can be as much as 250 parts per 100 parts of rubber.

Known stabilizers, especially those from the group of antiaging agents, fatigue inhibitors, antioxidants, light protecting agents and ozone protecting agents, as well as mixtures of those, can be added with advantage in the rubber mixtures of the invention, namely in amounts of 0.2 to 10 parts by weight based on 100 parts by weight of the halorubber.

Furthermore, it can be of particular advantage if the halorubber mixtures contain a plasticizer or plasticizer oil, for example highly aromatic naphthenic or paraffinic plasticizer, advantageously those with low setting points between about 0° and −60° C. The amount of plasticizer oil can swing within wide limits, thus it can be more than 0.5 to 5 parts by weight, especially more than 10 parts up to about 100 parts by weight, per 100 parts of halogen rubber.

The new halorubber mixtures preferably contain an organic acid which is solid at room temperature which is known to be useful in the rubber technology in an amount of 0.2 to 10 parts by weight based on 100 parts by weight of rubber. Preferably there are employed fatty acids such as stearic acid, or corresponding acids of the homologous series, for example, palmitic acid, myristic acid and lauric acid, as well as benzoic acid and salicyclic acid. Furthermore there must be added in the rubber mixtures of the invention oxides of polyvalent metals, which likewise are used in the rubber technology, in an amount of 0.1 to 15 parts by weight based on 100 parts by weight of rubber. Of primary importance among these metal oxides is zinc oxide, particularly in finely divided and/or active form. Furthermore there are also advantageously employed magnesium oxide or in a given case lead oxide. These oxides are preferably added in finely divided, active or powdery form. Mixtures of the metal oxides can also be used.

The new halorubber mixtures are produced in customary manner. A two-step mixing cycle is preferred. In the first step the following constituents are mixed in a kneading apparatus at a flow (throughput) temperature between 55° C. and 65° C., preferably 60° C.

Within the first minute the rubber and metal oxide, thus for example polychlorobutadiene and magnesium oxide are mixed;

within the next one and a half minutes half of the silicate filler and any other fillers;

within the next one and a half minutes the second half of the silicate filler, optionally the halosilane, the plasticizer, e.g. plasticizer oil and the remaining constituents with the exception of the silicon containing isothiuronium compound of formula I and the zinc oxide; after a total of four and a half minutes the mixture is expelled from the kneader.

In the second mixing step there is mixed into the preliminary mixture from the first mixing step the zinc oxide and the isothiuronium compound on a pair of rolls at a temperature of about 45° to 55° C., preferably 50° C.

This two-step mixing process avoids the premature pre-vulcanization of the mixture.

Industrial areas of use of the described rubber mixtures and their vulcanizates for example are: industrial rubber articles such as cable jackets, hoses, heating tubes, driving belts, V-belts, conveyor belts, roll coverings, packings, electrical insulation, coatings, impregnating agents and coatings for fabric, damping elements and vibration elements and the like articles which demand high requirements in regard to temperature and-/or oil resistance.

Unless otherwise indicated all parts and percentages are by weight.

The compositions can comprise, consist essentially of, or consists of the materials set forth.

Without limiting the invention there are given in the following examples several recipes for the new halorubber mixtures with test results, including the cross-linked products, with evaluation or comparisons of these results. Therein there are repeated many different concepts so that the following abbreviations are used.

List of Abbreviations Used

| Abbreviations | Designation | Measured In |
|---|---|---|
| $t_5$ | Mooney-scorch time (130° C.) | Minutes |
| $t_{35}$ | Mooney-cure time (130° C.) | Minutes |
| $ML_4$ | Mooney plasticity at 100° C., standard rotor testing time 4 minutes | |
| ZF | Tensile strength | MPa |
| M100 | Modulus 100% | MPa |
| M200 | Modulus 200% | MPa |
| M300 | Modulus 300% | MPa |
| BD | Elongation at break | % |
| SH | Shore A - Hardness | — |
| A | Abrasion (also "DIN abrasion") | $mm^3$ |
| CS | Compression set B, 22 hours 70° C. | % |

Testing Standards

The physical tests were carried out at room temperature according to the following standard specifications.

| (DIN = German Industrial Standard) | |
|---|---|
| Tensile strength, elongation at break and stretching value on 6 mm large rings | DIN 53504 |
| Shore A hardness | DIN 53505 |
| Specific gravity | DIN 53550 |
| Mooney Test | DIN 53524 |
| Abrasion, also called DIN abrasion | DIN 53516 |
| Determination of compression set of rubber | DIN 53517 |
| Rheometer testing | |

In the examples there were employed the following isothiuronium compounds:

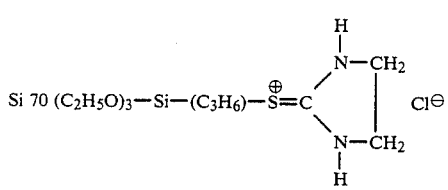

Si 71 as Si 70, but instead of $Cl^\ominus$ contains $Br^\ominus$,

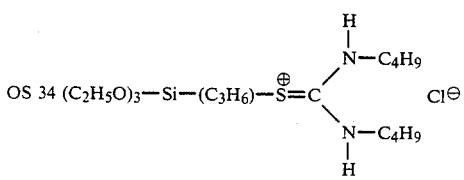

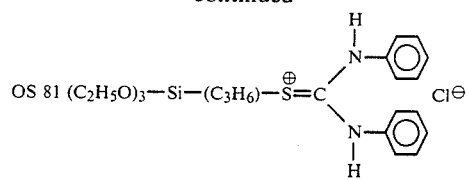

The cross-linked products or the test samples were produced in a steam heated multiple plunger press at the stated vulcanization temperatures and heating times (cross-linking lines).

In the examples the amounts of the components of the mixture are given in parts by weight. The term phr means per hundred parts of rubber.

DETAILED DESCRIPTION

Experiments with Chlorobutadiene Rubber

The base mixture A consists of the following components (data in parts by weight):

TABLE 1

| | |
|---|---|
| Polychlorobutadiene rubber (chlorine content about 38%; Viscosity 40 to 45 Mooney): | 100 |
| Magnesium oxide, finely divided | 4 |
| Stearic acid | 1 |
| Vaseline (salve type, pure hydrocarbon mixture from the residue of petroleum distillation) | 1 |
| N—Isopropyl-N'phenyl-p-phenylene-diamine (anti-ager) | 2 |
| Finely divided precipitated silica (VN 3 Ultrasil) | 40 |
| Zinc oxide, finely divided, active | 5 |

EXAMPLE 1

The base mixture A was supplemented in the following manner:

TABLE 2

| Sample Number | 1 | 2 | 3 |
|---|---|---|---|
| Chloropropyltriethoxysilane (Cl-PTES) | — | 2.5 | 0.73 |
| Si 70 | — | — | 2.52 |
| Ethylenethiourea (ETU) | 0.75 | 0.75 | — |

After the molding of the test pieces produced from the mixtures there was carried out the cross-linking at 170° C. in 60 minutes. The tests gave the following values:

TABLE 3

| Sample Number | 1 | 2 | 3 |
|---|---|---|---|
| $D_{min}$, [Nm] | 2.34 | 1.56 | 1.56 |
| M 300 [MPa] | 10.9 | 13.7 | 15.1 |
| $A_{[mm^3]}$ | 113 | 90 | 78 |
| CS | 25.5 | 14.8 | 12.2 |

The vulcanizate of the halogen rubber mixture of the invention (Sample 3) compared to the vulcanizate of the state of the art showed clearly better values in regard to tensile strength, Modulus 300%, Abrasion and Compression Set.

EXAMPLE 2

The base mixture A was supplemented in the following manner:

TABLE 4

| Sample Number | 1 | 4 | 5 |
|---|---|---|---|
| ClPTES | — | 2.5 | — |
| Si 70 | — | — | 2.0 |
| Ethylenethiourea (ETU) | 0.75 | 0.75 | — |

The vulcanization was carried out at 170° C. in 120 min.
The following values were measured:

TABLE 5

| Sample Number | 1 | 4 | 5 |
|---|---|---|---|
| $D_{min}$, Nm | 1.83 | 1.43 | 1.41 |
| ML 4 | 155 | 128 | 124 |
| ZF [MPa] | 13.8 | 15.7 | 18.7 |
| M 300% [MPa] | 7.9 | 14.5 | 16.8 |
| CS | 17.4 | 12.7 | 9.4 |

While in Example 1 the amount of Si 70 was so calculated that the amounts of thiourea or ClPTES correspond to the amount of Si 70 in samples Nos. 1 and 2, in Sample 2 there were employed 2 phr of Si 70 alone compared to 2.5 phr ClPTES to which there were added 0.75 phr ETU.

In this case also there were obtained clearly higher values for the tensile strength and modulus as well as a lower Compression Set (Sample 5) despite the lower amount of active material.

EXAMPLE 3

The base mixture was supplemented in the following manner.

TABLE 6

| Sample Number | 6 | 7 | 8 | 9 | 10 | 11 |
|---|---|---|---|---|---|---|
| ClPTES | — | 2.5 | — | — | — | — |
| Dibutylthiourea | 0.75 | 0.75 | — | — | — | — |
| OS 34 | — | — | 1 | 1.5 | 2 | 2.5 |

Using a vulcanization temperature of 170° C. and vulcanization times of 60 or 120 min. there were measured the following values.

TABLE 7

| Sample Number | 6 | 7 | 8 | 9 | 10 | 11 |
|---|---|---|---|---|---|---|
| Vulcanization time: (min) | 60 | 60 | 80 | 60 | 60 | 60 |
|  | 120 | 120 | 120 | 120 | 120 | 120 |
| ZF [MPa] | 18.5 | 18.7 | 23.6 | 21.0 | 19.4 | 22.7 |
|  | 17.1 | 24.6 | 23.4 | 24.8 | 19.3 | 23.7 |
| M 100% [MPa] | 1.9 | 2.3 | 2.2 | 2.5 | 2.8 | 3.1 |
|  | 2.3 | 2.5 | 3.1 | 3.0 | 3.4 | 3.2 |
| M 200% [MPa] | 4.4 | 6.1 | 6.0 | 7.1 | 8.1 | 8.8 |
|  | 5.1 | 7.0 | 8.0 | 8.5 | 9.4 | 9.5 |
| M 300% [MPa] | 8.1 | 12.0 | 11.5 | 13.6 | 15.5 | 16.5 |
|  | 8.8 | 13.3 | 14.1 | 15.8 | 17.1 | 17.9 |
| BD % | 560 | 410 | 540 | 410 | 370 | 390 |
|  | 520 | 480 | 460 | 440 | 320 | 380 |
| SH 23° C. | 63 | 66 | 65 | 68 | 69 | 68 |
|  | 67 | 69 | 72 | 72 | 72 | 72 |
| A mm³ | 123 | 89 | 79 | 73 | 69 | 71 |
|  | 124 | 83 | 84 | 73 | 67 | 62 |

There is shown with increasing OS 34 concentration increasing superiority of the halogen rubber mixtures 8–11 of the invention.

In order to produce the properties of a mixture according to the state of the art which contains 2.5 phr ClPTES and 0.75 phr DBTU (Sample 7) there suffices according to the invention 1 phr OS 34 in a halogen rubber.

EXAMPLE 4

The base mixture A was supplemented in the following manner.

TABLE 8

| Sample Number | 12 | 13 | 14 | 15 | 16 | 17 | 18 |
|---|---|---|---|---|---|---|---|
| ClPTES | — | 2.5 | — | — | — | — | — |
| Rhenocure CA | 0.75 | 0.75 | — | — | — | — | — |
| OS 81 | — | — | 0.5 | 1 | 1.5 | 2 | 2.5 |

There resulted a great viscosity reducing effect with OS 81 compared to the comparison mixtures 12 and 13. This is equivalent to a lesser energy expense in producing the mixtures.

TABLE 9

| Rheometer test (Monsanto, Type: MPV) Deformation amplitude: 3 stages, Testing frequency: 3 cycles/min, Running time: 2 h, test temperature: 170° C. | | | | | | | |
|---|---|---|---|---|---|---|---|
| Sample Number | 12 | 13 | 14 | 15 | 16 | 17 | 18 |
| Dmin [Nm] | 2.56 | 1.83 | 2.28 | 2.17 | 2.27 | 2.26 | 1.87 |
| Dmax [Nm] | | | | | | | |
| Dmax-Dmin [Nm] | | | | | | | |
| D120' [Nm] | 9.32 | 12.02 | 9.59 | 9.76 | 10.94 | 11.45 | 10.24 |
| D120'-Dmin [Nm] | 6.76 | 10.19 | 7.31 | 7.60 | 8.67 | 9.20 | 8.38 |
| D120'-D60' (%) | 16.4 | 13.2 | 20.3 | 20.2 | 18.1 | 16.6 | 11.6 |
| D120'-Dmin | | | | | | | |

The testing of the halogen rubber mixtures vulcanized at 170° C. gave the following values.

TABLE 10

| Sample Number | 12 | 13 | 14 | 15 | 16 | 17 | 18 |
|---|---|---|---|---|---|---|---|
| Vulcanization Time: (min) | 60 | 60 | 60 | 60 | 60 | 60 | 60 |
|  | 120 | 120 | 120 | 120 | 120 | 120 | 120 |
| ZF [MPa] | 17.3 | 16.9 | 20.0 | 21.2 | 20.8 | 22.2 | 23.2 |
|  | 15.2 | 20.4 | 21.2 | 21.8 | 22.4 | 24.7 | 23.5 |
| A [mm³] | 112 | 78 | 101 | 86 | 79 | 72 | 64 |
|  | 111 | 78 | 103 | 79 | 79 | 70 | 62 |

The mixtures containing the silicon containing isothiuronium compound shows clear superiority in the parameters tensile strength and abrasion. This is alrady established if only 0.5 phr OS 81 (Sample 14) is present in the mixture in comparison to 2.5 phr ClPTES and 0.75 phr Rhenocure CA (diphenyl thiourea).

EXAMPLE 5

In the base mixture A 20 parts of the silica were replaced by 20 parts of carbon black (Corax N330) and the mixture was supplemented as follows:

TABLE 11

| Sample Number | 19 | 20 | 21 |
|---|---|---|---|
| Ultrasil VN 3 | 30 | 30 | 30 |
| CORAX N 330 | 20 | 20 | 20 |
| Naftolen ZD | 10 | 10 | 10 |
| Cl-PTES | — | 2.5 | — |
| OS 81 | — | — | 1.0 |
| Diphenyl thiourea | 0.75 | 0.75 | — |

After vulcanization at 170° C. for 60 minutes, the following values were obtained.

TABLE 12

| Sample Number | 19 | 20 | 21 |
|---|---|---|---|
| ZF [MPa] | 17.3 | 21.1 | 20.4 |
| M 300 [MPa] | 8.9 | 12.7 | 12.2 |
| BD (%) | 520 | 470 | 470 |
| CS | 15.3 | 8.4 | 8.8 |

Accordingly the effectiveness of the silicon containing isothiuronium compound (Sample 21) is shown also in mixtures partially filled with carbon black. This is true even when employing clearly smaller amounts than in the starting materials, as shown in Sample 20.

EXAMPLE 6

In base mixture A the silica was replaced by 80 parts of Suprex Clay and supplemented as follows:

TABLE 13

| Sample Number | 22 | 23 | 24 | 25 | 26 | 27 |
|---|---|---|---|---|---|---|
| Suprex Clay | 80 | 80 | 80 | 80 | 80 | 80 |
| Naftolen ZD | 10 | 10 | 10 | 10 | 10 | 10 |
| Cl-PTES | — | 2.5 | — | — | — | — |
| OS 34 | — | — | 0.5 | 1 | 1 | 3 |
| Dibutylthiourea | 0.75 | 0.75 | — | — | — | — |

After the vulcanization for 20 minutes at 170° C. there resulted:

TABLE 14

| Sample Number | 22 | 23 | 24 | 25 | 26 | 27 |
|---|---|---|---|---|---|---|
| ML 4 | 57 | 52 | 58 | 55 | 51 | 51 |
| ZF [MPa] | 12.0 | 12.1 | 12.3 | 12.7 | 12.9 | 11.6 |
| M 300% [MPa] | 4.3 | 9.8 | 7.8 | 9.3 | 9.9 | 10.3 |
| BD (%) | 790 | 470 | 650 | 590 | 550 | 400 |
| CS | 12.6 | 7.5 | 9.2 | 8.0 | 7.4 | 7.8 |
| 22 h 70° C. | | | | | | |
| 70 h 100° C. | 38.4 | 26.5 | 26.3 | 24.7 | 24.7 | 24.5 |

Again the superiority of the halogen containing rubber mixtures with silicon containing isothiuronium compounds compared to the mixtures according to the state of the art is shown in these experiments. This is also established if there is employed a larger amount of halosilane and thiourea derivatives than is needed for the formation of the isothiuronium compound used in the demonstration mixture. This means that there is obtained a saving of material by employing the silicon containing isothiuronium compounds.

EXAMPLE 7

The base mixture A was supplemented in the following manner.

TABLE 15

| Sample Number | 28 | 29 | 30 | 31 |
|---|---|---|---|---|
| 3-Bromopropyltri-ethoxysilane | — | 2.5 | — | — |
| Si 71 | — | — | 1 | 2 |
| ETU | 0.75 | 0.75 | — | — |

After the vulcanization there resulted the following values:

TABLE 16

| Sample Number | 28 | 29 | 30 | 31 |
|---|---|---|---|---|
| Vulcanization time [Min] | 60 | 60 | 60 | 60 |
|  | 120 | 120 | 120 | 120 |
| ZF [MPa] | 16.8 | 16.8 | 21.7 | 20.5 |
|  | 15.6 | 19.0 | 20.7 | 20.4 |

TABLE 16-continued

| Sample Number | 28 | 29 | 30 | 31 |
|---|---|---|---|---|
| M 200 | 6.4 | 8.3 | 5.9 | 7.7 |
| Modulus 200% [MPa] | 5.9 | 7.4 | 7.2 | 8.7 |
| M 300 [MPa] | 10.0 | 14.6 | 10.9 | 13.7 |
|  | 9.3 | 14.1 | 12.6 | 15.4 |
| Abrasion [mm³] | 119 | 97 | 85 | 81 |
|  | 138 | 101 | 95 | 86 |

Here also there is shown the superiority of the vulcanizate which contain the silicon containing isothiuronium compounds to the vulcanizate which contains the ethylenethiourea (ETU) and 3-bromopropyltriethoxysilane (Br PTES) (Sample 29) although the amount of Si 71 is clearly below the total of the amounts of Br-PTES and ETU employed.

The entire disclosure of German priority application No. P 3319251.0 is hereby incorporated by reference.

What is claimed is:

1. A vulcanizable rubber composition comprising at least one halogen containing rubber, a silicate filler, and an isothiuronium compound of the formula

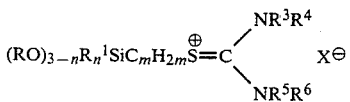

in an amount of 0.1 to 5 parts by weight based on 100 parts by weight of the halogen containing rubber, and wherein X is chloride, bromide or iodide, m is a number from 1 to 6, $R^1$ is a $C_1$ to $C_5$ alkyl group, a $C_5$ or $C_6$-cycloalkyl group or the phenyl group, R is a $C_1$ to $C_5$ alkyl group, a $C_5$ or $C_6$ cycloalkyl group, the α-methoxyethyl group, the phenyl group or the benzyl group, n is 0, 1 or 2, $R^3$, $R^4$, $R^5$, $R^6$ are the same or different and are hydrogen, or $C_1$–$C_5$ alkyl group, or $R^3$, $R^5$ are hydrogen and $R^4$, $R^6$ are the same or different and are hydrogen, a $C_5$–$C_6$-cycloalkyl group, the phenyl group or the benzyl group, or $R^4$ and $R^6$ together are a connected $C_2$–$C_4$ alkylene chain.

2. A composition according to claim 1 including a halosilane.

3. A composition according to claim 1 free from a halosilane.

4. A composition according to claim 1 wherein $R^1$ is $C_1$ to $C_5$ alkyl and R is $C_1$ to $C_5$ alkyl.

5. A composition according to claim 4 where n is 0.

6. A composition according to claim 5 where m is 2 or 3.

7. A composition according to claim 6 containing 10 to 250 parts of silicate filler, 0 to 3 parts of halosilane, 0 to 150 parts of carbon black, 0.1 to 15 parts of magnesium oxide, lead oxide or zinc oxide.

8. A composition according to claim 1 containing 10 to 250 parts of silicate filler, 0 to 3 parts of halosilane, 0 to 150 parts of carbon black, 0.1 to 15 parts of magnesium oxide, lead oxide or zinc oxide.

9. A composition according to claim 8 wherein the halogen containing rubber is polychlorobutadiene, chlorobutyl rubber or bromobutyl rubber.

10. A composition according to claim 9 wherein the silicate is precipitated silica.

11. A composition according to claim 10 containing magnesium oxide.

12. The vulcanized product obtained by vulcanizing the composition of claim 1.

13. The vulcanized product obtained by vulcanizing the composition of claim 4.

14. The vulcanized product obtained by vulcanizing the composition of claim 5.

15. The vulcanized product obtained by vulcanizing the composition of claim 6.

16. The vulcanized product obtained by vulcanizing the composition of claim 8.

17. The vulcanized product obtained by vulcanizing the composition of claim 9.

18. The vulcanized product obtained by vulcanizing the composition of claim 10.

19. A process of vulcanizing the composition of claim 1 comprising heating the composition at 100° to 200° C. for 1 to 200 minutes.

20. A composition according to claim 1 wherein the isothiuronium compound is either

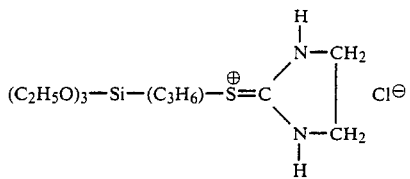

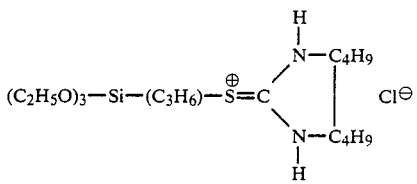

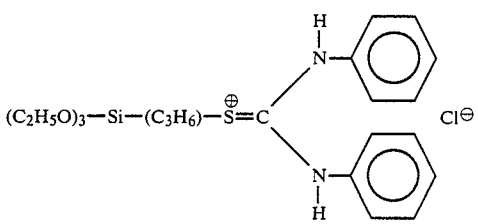

or

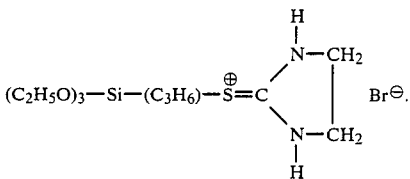

* * * * *